(12) United States Patent
Rodenberg et al.

(10) Patent No.: US 7,273,554 B2
(45) Date of Patent: Sep. 25, 2007

(54) CROSSFLOW-FILTRATION METHOD FOR BEVERAGES

(75) Inventors: Michael Rodenberg, Adelebsen (DE); Bernhard Diel, Rosdorf (DE); Matthias Grabosch, Bovenden (DE); Dieter Armgart, Moringen (DE)

(73) Assignee: Sartorius Biotech GmbH, Goettingen (DE)

( * ) Notice: Subject to any disclaimer, the term of this patent is extended or adjusted under 35 U.S.C. 154(b) by 324 days.

(21) Appl. No.: 10/517,566

(22) PCT Filed: Jun. 14, 2003

(86) PCT No.: PCT/EP03/06296

§ 371 (c)(1),
(2), (4) Date: Dec. 9, 2004

(87) PCT Pub. No.: WO2004/007659

PCT Pub. Date: Jan. 22, 2004

(65) Prior Publication Data

US 2005/0230311 A1 Oct. 20, 2005

(30) Foreign Application Priority Data

Jul. 12, 2002 (DE) .............................. 102 31 835

(51) Int. Cl.
*B01D 61/00* (2006.01)
*C12H 1/00* (2006.01)

(52) U.S. Cl. ...................... 210/649; 210/636; 210/749; 210/750; 210/791; 426/330.4; 426/330.3; 426/590; 426/592; 426/495

(58) Field of Classification Search ..................... None
See application file for complete search history.

(56) References Cited

U.S. PATENT DOCUMENTS 4,724,080 A * 2/1988 Dau et al. ................... 210/651
4,844,932 A * 7/1989 Daoud ........................ 426/489
5,252,218 A * 10/1993 Muraldihara et al. ....... 210/636
5,354,466 A * 10/1994 Yunoki ................... 210/321.69
5,958,243 A * 9/1999 Lawrence et al. .......... 210/636
6,139,724 A * 10/2000 Strohm et al. ................ 210/85
6,692,786 B1 * 2/2004 Denk et al. .............. 426/330.4

FOREIGN PATENT DOCUMENTS

| DE | 42 27 225 A1 | 2/1994 |
| DE | 43 32 175 A1 | 3/1995 |
| DE | 44 01 456 A1 | 6/1996 |
| WO | WO 9520038 A1 * | 7/1995 |

OTHER PUBLICATIONS

International Search Report for PCT/EP2003/006296 dated Oct. 29, 2003.

* cited by examiner

*Primary Examiner*—Krishnan S. Menon
(74) *Attorney, Agent, or Firm*—Anthony J. Casella; Gerald E. Hespos

(57) ABSTRACT

The invention relates to a crossflow-filtration method for beverages, in particular beer, which comprises the following steps: a) the feed liquid is introduced into a filter module by means of a tangential flow through a filter membrane (6) in a first direction, whereby the filtrate flow on the filtrate side (19) of the filter module is maintained within predetermined threshold values; b) the entry pressure is reduced and the filter is backflushed by surges of filtrate initiated by a reversal of the flow direction transversally to the membrane; c) the feed liquid is optionally introduced in an inverse flow direction to that of step a) and the concentrate is evacuated on the non-filtrate (7) side of the module; d) the entry pressure is reduced and the filter is backflushed by surges of filtrate initiated by a reversal of the flow direction transversally to the membrane; e) steps a) to d) are repeated until the filtrate flow lies below the lower predetermined threshold value; f) to k) the filter is emptied by applying pressure, backflushed, rinsed and l) steps a) to k) are resumed.

18 Claims, 2 Drawing Sheets

CROSSFLOW-FILTRATION METHOD FOR BEVERAGES

The invention relates to a crossflow-filtration method for beverages, in particular beer, which are fed as the feed liquid at filtration intervals to a filter module with at least one membrane.

The crossflow-filtration of beer has not so far become established on the market, since the filtration costs are above those of the standard methods, such as diatomite filtration for example. One cause of the uncompetitive cost-effectiveness is that the membranes are clogged so much after only fifty filtration cycles that they can no longer be chemically regenerated by conventional methods (Bruens, Lute, Brauwelt 38, 2001, pages 1639-1643: "Ist die Crossflow-Bierfiltration mittlerweile eine wirtschaftliche Alternative?" (Has crossflow beer filtration become a cost-effective alternative?]).

One approach to solving this problem is that of using catalytic-oxidative cleaning agents. Although the use of these agents allows the membranes to be completely regenerated, these agents are very questionable with respect to environmental compatibility, so that their use is prohibited in some countries of the EU. A further, decisive disadvantage is that the agent is highly aggressive to polymer membranes, whereby the service life of the filter modules is greatly reduced. This may even result in the long term in higher filtration costs than in the case of the comparable alternative solutions, such as diatomite and layer filtration. For these reasons, it is appropriate to have a filtration method with which it is possible to dispense with the use of aggressive cleaning agents.

EP 0 689 585 B1 discloses a method for clarifying beer with the aid of crossflow micro-filtration. In the case of this method, it is intended to increase the filtrate throughput by periodically removing deposited layers covering the membrane at short filtration intervals, the membrane being flushed with cleaning liquids at first filtration intervals and the adhesive attachment of the covering layer to the membrane being chemically attacked by dissolution, so that the partially dissolved covering layers are subsequently flushed by flushing liquid, preferably water, from the filtrate side to the unfiltrate side and at least partially removed. In this case it is proposed to control the transmembrane pressure on the basis of a time function, so that an integrated backflushing with filtrate occurs at specific time intervals. The membrane pressure is intended in this case to have substantially periodic, for example sinusoidal, triangular or sawtooth-like functions. It is also proposed in this document to reverse the direction of flow of the beer along the membrane.

Although the known method does bring about an improvement, it has not as yet led to the hoped-for long service lives of the membrane and the associated reduction in costs.

Furthermore, EP 0 645 174 B1 discloses a crossflow filtration method for beer in which the beer is passed over an asymmetrical membrane which has such a pore structure that the pores on the feed side of the membrane are larger than the nominal pore size and the pores of the nominal pore size occur in the cross section in the direction of the permeate side, the filtered-out components being discontinuously backflushed from the membrane and subsequently flushed away with the liquid. The backflushing in this case lasts 0.05 to <1 s, the membrane having a normal pore size of 0.1 to 5 μm.

A disadvantage of the known method is that a relatively complex and expensive membrane is required. It is also the objective with this method to improve the service lives and to lower the filtration costs.

Furthermore, DE 43 32 175 C2 discloses a crossflow-filtration method for liquids, in particular heterodisperse suspensions, such as beer, by means of crossflow microfiltration modules, in which filtration cycles and cleaning cycles alternate, the transmembrane pressure being continuously measured during the filtration, and in which the cleaning cycle is carried out whenever the transmembrane pressure exceeds a predetermined value. In this document, it is pointed out to a person skilled in the art that periodic backflushing to influence the covering layer forming on the membrane has the disadvantage that, with increasing operating time, the flux rate is lower than in the preceding cycle, even at the beginning, that is after the backflushing with filtrate, which can be explained by the fact that certain adsorption effects occur, leading to limited clogging of the membrane.

A disadvantage of this known method is that chemical cleaning has to be carried out relatively quickly and frequently. Here, too, there is still room for improvement of the service life of the membranes.

The object of the present invention is therefore to propose a crossflow filtration method for beverages which has longer service lives of the membranes and can be carried out at lower cost.

This object is achieved in conjunction with a crossflow-filtration method for beverages, in particular beer, which are fed as the feed liquid at filtration intervals to a filter module with at least one membrane, which is cleaned with a cleaning solution and flushed with water from the filtrate side at cleaning intervals lying between the filtration intervals, by the following steps being carried out:

a) introduction of the feed liquid into the filter module via a first connection on the unfiltrate side over a predeterminable flowing-over time period with an entry pressure which is adequate to keep the filtrate flow on the filtrate side of the filter module within predetermined limit values, and evacuation of the concentrate via a second connection on the unfiltrate side of the filter module, b) reduction of the entry pressure at the first connection and backflushing by surges of filtrate with reversal of the direction of flow transversely to the membrane, c) repetition of steps a) and b) until the filtrate flow goes below the lower predetermined limit value, d) emptying of the filter module by applying pressure, e) backflushing of the filter module from the filtrate side with water and subsequently with a solution containing chemicals, f) leaving the filter module filled with the solution containing chemicals to rest for a predetermined exposure time, g) flushing of the filter module with water until neutrality is established, h) filling of the filter module with degassed water, i) forcing out of the water from the filter module with gas and leaving the filter module to recover and continuation with steps a) to k).

According to a preferred embodiment of the invention, step b) is followed by additionally carrying out steps b1) and b2), that is:

b1) introduction of the feed liquid with reversal of the direction of flow longitudinally to the membrane into the filter module via the second connection or an adjacent third connection on the unfiltrate side over the predetermined flowing-over time period with an entry pressure which is adequate to keep the filtrate flow on the filtrate side of the filter module within the predetermined limit values, and evacuation of the concentrate via the first connection or a fourth connection adjacent the first connection on the unfiltrate side of the filter module, and b2) reduction of the entry pressure at the second or fourth connection and backflushing by surges of filtrate by means of reversal of the direction of flow transversely to the membrane.

It has surprisingly been found that, when the method steps according to the invention are carried out, the membrane shows an extremely good development of the water values over the series of tests. Beer was filtered over a time period of four months, in the course of which over 300 filtration cycles were carried out. It was found here that, after no intermediate cleaning, the water value was below 83%. By prolonged cleaning with sodium hydroxide solution over a time period of 30-60 minutes, it was repeatedly possible to achieve the water value of the new membrane once again. This excellent regenerating behavior of the membrane has the following technological benefits, whereby the filtration costs are significantly lowered:

- The length of the filtration intervals is constant and not reduced with time in use.
- By cleaning without strongly oxidative cleaning agents, the membranes are not damaged.
- The service life of the filter modules is not adversely influenced, whereby the cost-effectiveness of the method increases.
- By introducing the feed liquid into the filter module within predetermined limit values while evacuating the concentrate via a second connection, by reducing the entry pressure in conjunction with backflushing by surges of filtrate, preferably by a reversal of the direction of flow longitudinally to the membrane and subsequent reversal of the direction of flow transversely to the membrane, effective and gentle regeneration of the membranes is achieved in conjunction with the steps which follow.

According to a preferred embodiment of the invention, in steps a) and b1) the filtrate flow is kept substantially constant by means of regulating the speed of a recirculation pump. By working in this way, the filtration is started with a low entry pressure, whereby early compaction of a covering layer is prevented. In the course of filtration, the flowing-over must be continuously increased in order to obtain a constant filtrate flow. At the same time, the entry pressure slowly rises.

According to a further preferred embodiment of the invention, steps a) and b1) are respectively carried out in a fixed time interval, lying between one and five minutes. Steps b) and b2) are in this case carried out with a backflushing pressure which preferably lies 0.5 bar above the entry pressure of the filter module. The backflushing pressure is in this case generated by means of a filtrate backflushing pump with a backflushing valve arranged upstream toward the filter module for generating a pressure surge.

It is particularly advantageous if the backflushing after a reversal of the direction of flow is carried out with a predetermined opening time of the backflushing valve of 100 to 700 ms, preferably about 300 ms. In this case, the output of the recirculation pump is reduced to a new offset value directly after the backflushing. This prevents an inadmissibly high filtrate flow directly after the backflushing operation, since the degree of clogging, and consequently also the through-flow resistance, of the membrane is drastically reduced after backflushing has taken place. An inadmissibly high filtrate flow would lead to undesired rapid clogging of the membrane. In this case, it is advantageous to lower the output of the recirculation pump to a pre-calculated value already during the reversal of the direction of flow. The filter module entry pressure is simultaneously lowered as a result. As a result of this, the backflushing pressure (0.5 bar above filter module entry pressure) can be lowered in the filtrate backflushing, whereby the loading on the modules is reduced. Furthermore, the filtration is smoothly started again after backflushing, whereby rapid clogging of the membrane is prevented.

According to a further preferred embodiment of the invention, the new offset value (output of the recirculation pump directly after backflushing) is calculated in accordance with the formula $$\text{offset}_n = (\text{current output} - 15\% \cdot \text{offset}_{n-1}) \cdot 0.9 + \text{offset}_{n-1}.$$

By the use of offset reducing, it was possible in tests to increase the service lives by more than 50%.

According to a preferred embodiment of the invention, the membrane has a pore size of 0.4 to 0.6 µm, preferably of about 0.5 µm.

Further preferred embodiments of the invention are described in the specification.

Further details of the invention emerge from the full description which follows and the accompanying drawings, in which preferred embodiments of the invention are illustrated by way of example.

Figure 1:
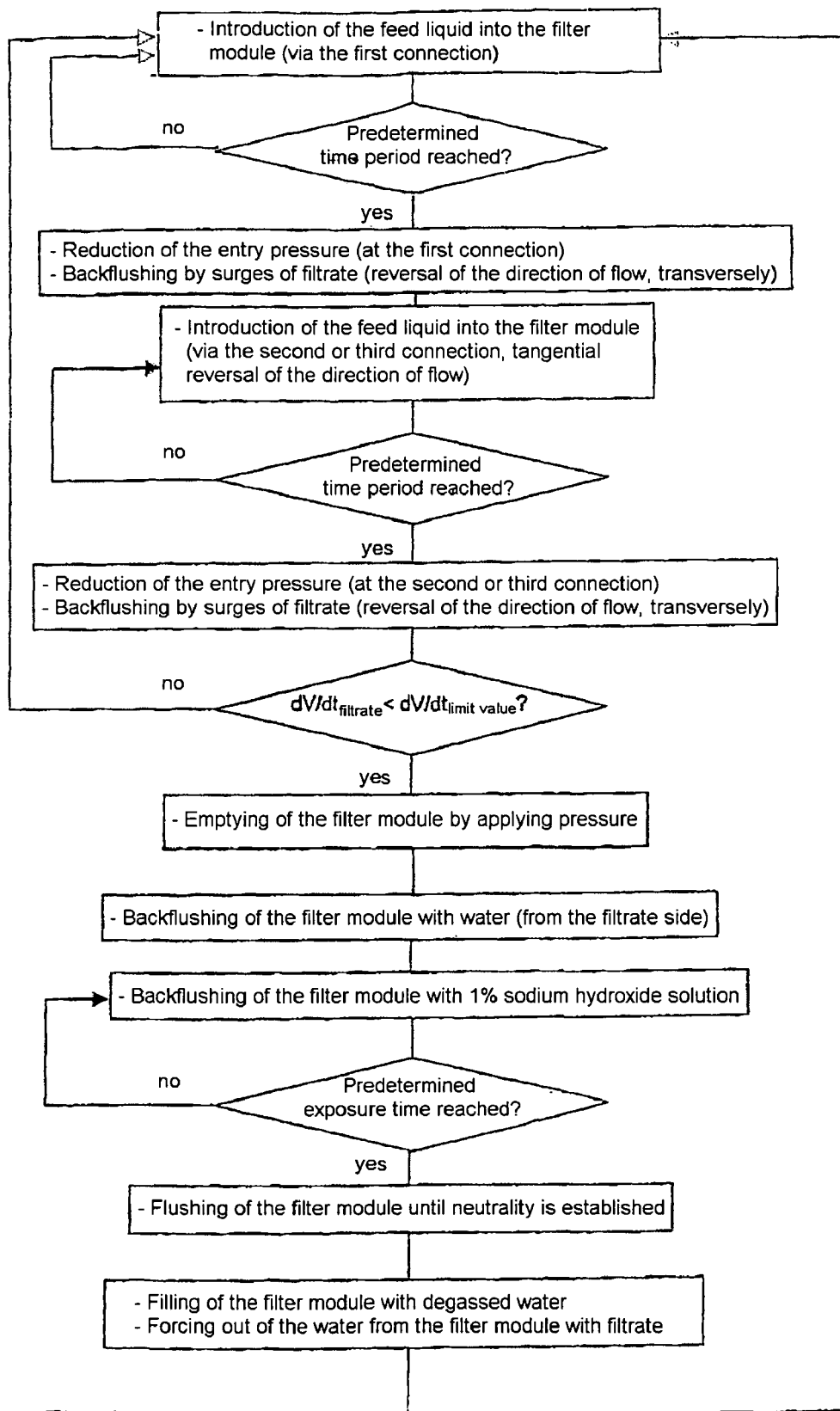
FIG. 1 shows a schematic sequence of the method.
Figure 2:
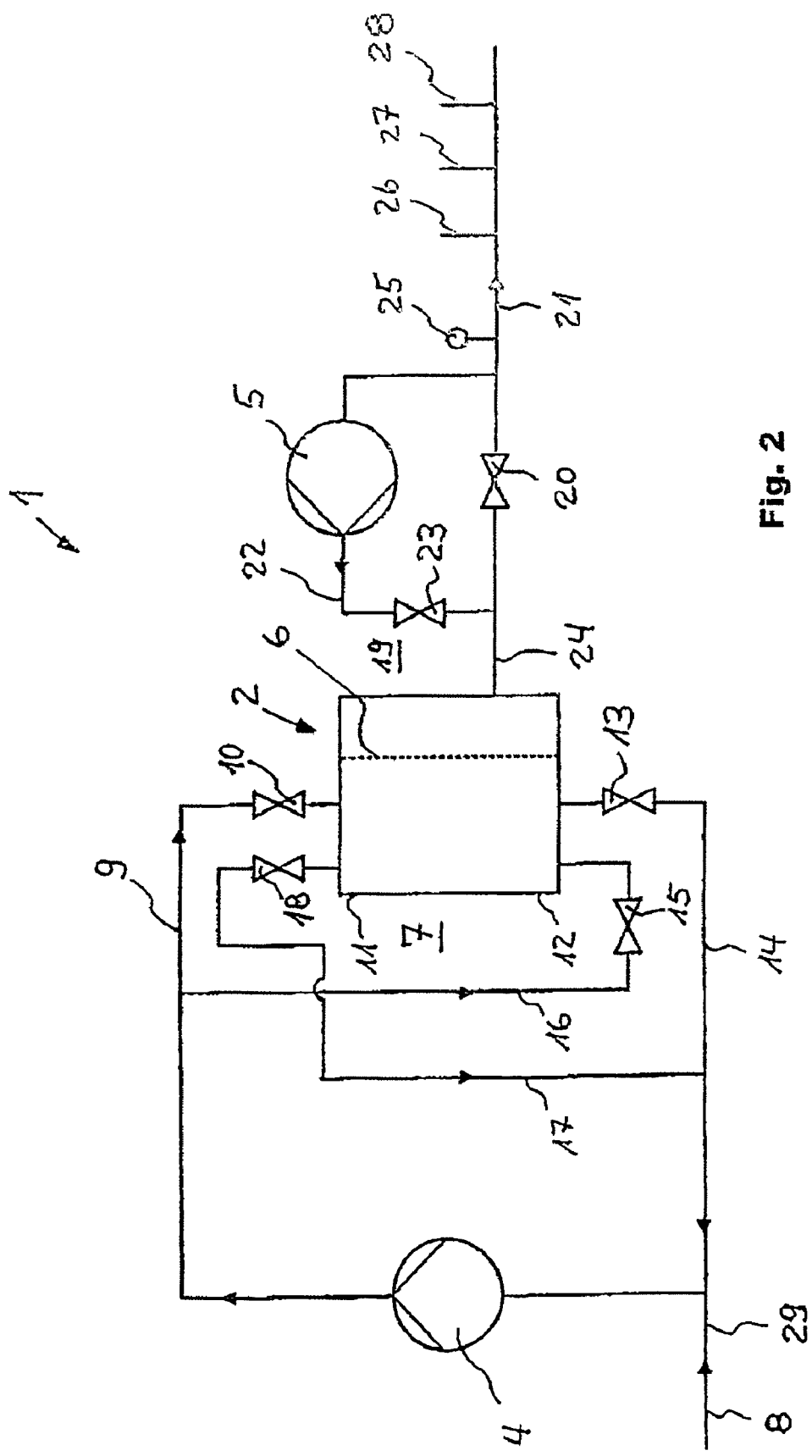
FIG. 2 shows a schematic representation of a filtration system for the crossflow filtration of beer.

A filtration system 1 substantially comprises a filter module 2, a recirculation pump 4 and a filtrate backflushing pump 5.

Sartocon® cassettes of the Sartorius company preferably come into consideration as filter modules 2.

On the unfiltrate side 7, the recirculation pump 4 is located upstream of the filter module 2. Feed liquid 8 is fed to the filter module 2 by means of the recirculation pump 4 and forms the unfiltrate. The recirculation pump 4 is connected via a first feed line 9 to a first connection 10 at the first end 11 of the filter module 2. A second connection 13, arranged on the unfiltrate side 7 at the second end 12 of the filter module 2, lying opposite the first end 11, is connected via a retentate line 14 to the recirculation pump 4 for recirculation. At the second end 12, the second connection 13 has an adjacent third connection 15 on the unfiltrate side 7. For a tangential reversal of the direction of flow, the recirculation pump 4 is connected via a second feed line 16 to the third connection 15. For evacuating the retentate or the concentrate from the filter module 2, a fourth connection 18 is arranged adjacent the first connection 10 at the first end 11 of the filter module 2. The second retentate line 17 consequently connects the fourth connection 18 to the retentate line 14 and the recirculation pump 4. On the filtrate side 19 of the filter module 2, the filter module 2 is connected via a first valve 20 to a filtrate line 21. On the side of the first valve 20 facing away from the filter module 2, the filtrate backflushing pump 5 is connected via a backflushing line 22 to the filtrate line 21. On the exit side, the filtrate backflushing pump 5 is connected via a backflushing valve 23 to a segment 24 of the filtrate line 21 on the filter module side. On the side of the filtrate line 21 facing away from the filtrate module 2, a flow meter 25 is arranged for measuring the filtrate flow. Furthermore, a cold water line 26 for feeding in cold water, a hot water line 27 for feeding in hot water and a zip line 28 for feeding in chemicals, for example sodium hydroxide solution (NaOH), are connected to the filtrate line 21.

The feed liquid 8, for example in the form of beer to be filtered, is fed via a feed line 29 by means of the recirculation pump 4 to the filter module 2 via the first connection 10. The feed liquid 8 thereby flows in a tangential direction past the membrane 6 and is removed via the second connection 13 as a concentrate and fed via the retentate line 14 once more to the recirculation pump 4. The filtrate flowing transversely to the membrane 6 flows via the first valve 20 via the filtrate line 21 into a filtrate tank (not represented). The filtrate flow is measured by the flow meter 25 and kept constant over a predetermined time period by controlling the speed of the recirculation pump 4. This is followed by a reduction of the entry pressure at the first connection 10 and backflushing by surges of filtrate. For filtrate backflushing or reversal of the direction of flow, the filtrate backflushing pump 5 is started with the backflushing valve 23 closed. Subsequently, the first valve 20 is closed and the backflushing valve 23 is opened for a short period of 100 to 700 ms, preferably of 300 ms. The output of the recirculation pump 4 is already lowered during the feed reversal to a pre-calculated offset value (output of the recirculation pump 4 directly downstream of backflushing). The calculation takes place in accordance with the formula:

$$\text{offset}_n = (\text{current output} - 15\% \text{ offset}_{n-1}) \cdot 0.9 + \text{offset}_{n-1}.$$

This is followed by a tangential reversal of the direction of flow by introducing the feed liquid via the third connection 15 into the filter module 2 and evacuating the concentrate via the fourth connection 18. After reaching a predetermined time period, a reduction of the entry pressure (at the third connection) and backflushing by surges of filtrate from the filtrate side 19 again take place. The filtration pass is completed when the current filtrate flow $dV/dt$ filtrate < predetermined limit value $dV/dt$ limit value. Intermediate cleaning is then initiated. For this purpose, firstly the filter module 2 is forced out of the system into a collecting tank (not represented) by gas ($CO_2$) from the unfiltrate side 7 and later reused. After that, the filtration system 1 is first flushed from the filtrate side 19 with cold water fed in via the cold water line 26 (about 30 s for the removal of remains of concentrate) and after that flushed with hot water at a temperature of about 60° C. fed in via the hot water line 27 for about 1 min. Shortly before shutting off the hot water, NaOH is metered into the flushing water via the zip line 28. The metering is in this case set in such a way that the filter module is filled with 1% NaOH. After a pause of at least 5 min, the sodium hydroxide solution is flushed for 2 min with hot water and 4 min with cold water, it being possible for a metering of citric acid to be used for neutralization. In conclusion, the filtration system 1 is filled with degassed water. After the intermediate cleaning, the degassed water is forced out of the filtration system 1 with $CO_2$ and pressurized. As a result, there are no longer any remains of oxygen in the filtration system, so that oxygen absorption of the beer which is subsequently filled into the filtration system 1 can be ruled out.

EXAMPLE

In a brewery, a total of 15 hl of unfiltered beer was taken from the feed line of a beer filter over a time of 3 h and, after filtration with a modified Sartoflow 10 system of the Sartorius company with a filter area of 7 m², fed back into the beer line. The system therefore ran with a throughflow of 500 l/h, which corresponds to a throughflow (flux) of over 70 l/hm². After 3 h, intermediate cleaning was carried out for the first time and the filtration was started again directly after that. In the subsequent filtration, the same filtration output as in the first cycle was achieved. In the tests it was possible to repeat this more than 300 times over a time period of 4 months, the output of the filtration system not falling below 80% of the initial output, so that it can be assumed that this result can also be maintained over a still longer time period. The filtration costs achieved lie below those of comparable filtration methods, so that use on an industrial scale is feasible.

The invention claimed is:

1. A crossflow-filtration method for beverages, in particular beer, which are fed as the feed liquid at filtration intervals to a filter module with at least one membrane, which is cleaned with a cleaning solution and flushed with water from the filtrate side at cleaning intervals lying between the filtration intervals, characterized in that the following steps are carried out:
   a) introduction of the feed liquid (8) into the filter module (2) via a first connection (10) on the unfiltrate side (7) over a predeterminable flowing-over time period with an entry pressure created by a recirculation pump (4) located on said unfiltrate side which is adequate to keep the filtrate flow on the filtrate side (19) of the filter module (2) within predetermined limit values, and evacuation of the concentrate via a second connection (13) on the unfiltrate side (7) of the filter module (2),
   b) reduction of the entry pressure at the first connection (10) and backflushing by surges of filtrate by means of reversal of the direction of flow transversely to the membrane (6) by means of a filtrate backflushing pump (5) with a backflushing valve (23) arranged upstream toward the filter module (2) for generating a pressure surge and wherein the opening time of the backflushing valve (23) is between 100 and 700 ms,
   c) repetition of steps a) and b) until the filtrate flow goes below the lower predetermined limit value,
   d) emptying of the filter module (2) by applying pressure,
   e) backflushing of the filter module (2) from the filtrate side (19) with water and subsequently with a solution containing chemicals,
   f) leaving the filter module (2) filled with the solution containing chemicals to rest for a predetermined exposure time,
   g) flushing of the filter module (2) with water until neutrality is established,
   h) filling of the filter module (2) with degassed water,
   i) forcing out the degassed water from the filter module (2) with filtrate and
   j) continuation with steps a) to i).

2. The method as claimed in claim 1, characterized in that step b) is followed by including the following steps:
   b1) introduction of the feed liquid (8) with reversal of the direction of flow longitudinally to the membrane (6) into the filter module (2) via the second connection or an adjacent third connection (13, 15) on the unfiltrate side (7) over the predetermined flowing-over time period with an entry pressure which is adequate to keep the filtrate flow on the filtrate side (19) of the filter module (2) within the predetermined limit values, and evacuation of the concentrate via the first connection or a fourth connection (18) adjacent the first connection (10) on the unfiltrate side (7) of the filter module (2), and b2) reduction of the entry pressure at the second or fourth connection (13, 18) and backflushing by surges of filtrate by means of reversal of the direction of flow transversely to the membrane (6).

3. The method as claimed in claim 2, characterized in that in steps a) and b1) the filtrate flow is kept substantially constant by means of regulating the speed of a recirculation pump (4).

4. The method as claimed in claim 2, characterized in that steps a) and b1) are respectively carried out in a fixed time interval of between one and five minutes.

5. The method as claimed in claim 2, characterized in that steps b) and b2) are carried out with a backflushing pressure which lies at least 0.5 bar above the entry pressure of the filter module (2).

6. The method as claimed in claim 1, characterized in that the opening time of the backflushing valve (23) is about 300 ms.

7. The method as claimed in claim 6, characterized in that the output of the recirculation pump (4) is reduced to a new offset value ($offset_n$) directly after the backflushing.

8. The method as claimed in claim 7, characterized in that the output of the recirculation pump (4) is lowered to the new offset value ($offset_n$) already during the reversal of the direction of flow of the feed liquid (8) longitudinally to the membrane (6).

9. The method as claimed in claim 8, characterized in that the new offset value ($offset_n$) is calculated in accordance with the formula $offset_n$=(current output-15% $offset_{n-1}$) 0.9=$offset_{n-1}$.

10. The method as claimed in claim 1, characterized in that the emptying of the filter module (2) of concentrate by applying pressure after step d) takes place with $CO_2$ as the gas.

11. The method as claimed in claim 10, characterized in that the concentrate is collected in a tank for later reuse.

12. The method as claimed in claim 1, characterized in that the backflushing after step e) takes place firstly with cold water and subsequently with hot water, to which sodium hydroxide solution is added shortly before shutting off.

13. The method as claimed in claim 12, characterized in that the filter module (2) is flushed with cold water for about 30 seconds and with hot water at a temperature of about 60° C. for about 1 minutes.

14. The method as claimed in claim 12, characterized in that the metering of the sodium hydroxide solution is set such that the filter module (2) is filled with about 1% sodium hydroxide solution.

15. The method as claimed in claim 1, characterized in that the exposure time after step f) is at least 5 minutes.

16. The method as claimed in claim 1, characterized in that, in a way corresponding to step g), flushing is performed firstly with hot water for about 2 minutes and subsequently with cold water for about 4 minutes.

17. The method as claimed in claim 16, characterized in that citric acid is metered in with the cold water to establish neutralization.

18. The method as claimed in claim 1, characterized in that the membrane (6) has a pore size of 0.4 to 0.6 μm, preferably of about 0.5 μm.

\* \* \* \* \*